United States Patent [19]

Brennan

[11] Patent Number: 4,718,719
[45] Date of Patent: Jan. 12, 1988

[54] ENERGY ABSORBING AIRCRAFT SEAT FRAME STRUCTURE

[75] Inventor: Edward J. Brennan, Litchfield, Conn.
[73] Assignee: PTC Aerospace Inc., Bantam, Conn.
[21] Appl. No.: 893,175
[22] Filed: Aug. 5, 1986
[51] Int. Cl.$^4$ .............................................. B60R 21/00
[52] U.S. Cl. ................................ 297/216; 244/122 R; 248/188.1; 296/65 A
[58] Field of Search ............... 297/216, 445; 296/35.2, 296/65 A; 244/222 R; 248/188.1, 188

[56] References Cited

U.S. PATENT DOCUMENTS

| | | | |
|---|---|---|---|
| 2,959,207 | 11/1960 | Brewster | 297/216 |
| 3,059,966 | 10/1962 | Spielman | 297/216 |
| 4,440,441 | 4/1984 | Marruso et al. | 297/216 |
| 4,526,421 | 7/1985 | Brennan et al. | 297/216 |

FOREIGN PATENT DOCUMENTS 2307366  8/1974  Fed. Rep. of Germany ... 296/65 A

*Primary Examiner*—James T. McCall
*Attorney, Agent, or Firm*—Barry L. Clark

[57] ABSTRACT

Improved energy absorbing seat frame structure for an aircraft seat has leg structures which comprise a pair of generally U-shaped front and rear legs which are joined back to back in a generally X-shaped configuration. A curved die member is held in contact with the forward facing concave portion of the front leg by a strap member which surrounds the rear leg. In a crash situation, the front leg can bend about the die member to lower the center of gravity. In a preferred embodiment, strap type clamps on the upper ends of each leg permit the legs to rotate relative to the tubular stretcher members of the seat. The ability of the front legs to be deformed downwardly permits a portion of the excess loading on one front leg to be transferred through the front stretcher member to the other leg which is less heavily loaded. Pin joint connections of the leg assembly to the front and rear track fittings enables the structure to accommodate, and to uniformly transfer, loading to seat tracks which have been deformed vertically. A modified fitting also accommodates twisting deformation of the seat track. The seat can have its front and rear legs positioned closer together than conventional seats for a given "G" loading, so as to increase passenger leg room behind the seat. Alternatively, for a given front to rear leg spacing distance, the "G" loading capacity of a particular seat can be significantly increased without increasing the loading on the seat track.

11 Claims, 10 Drawing Figures

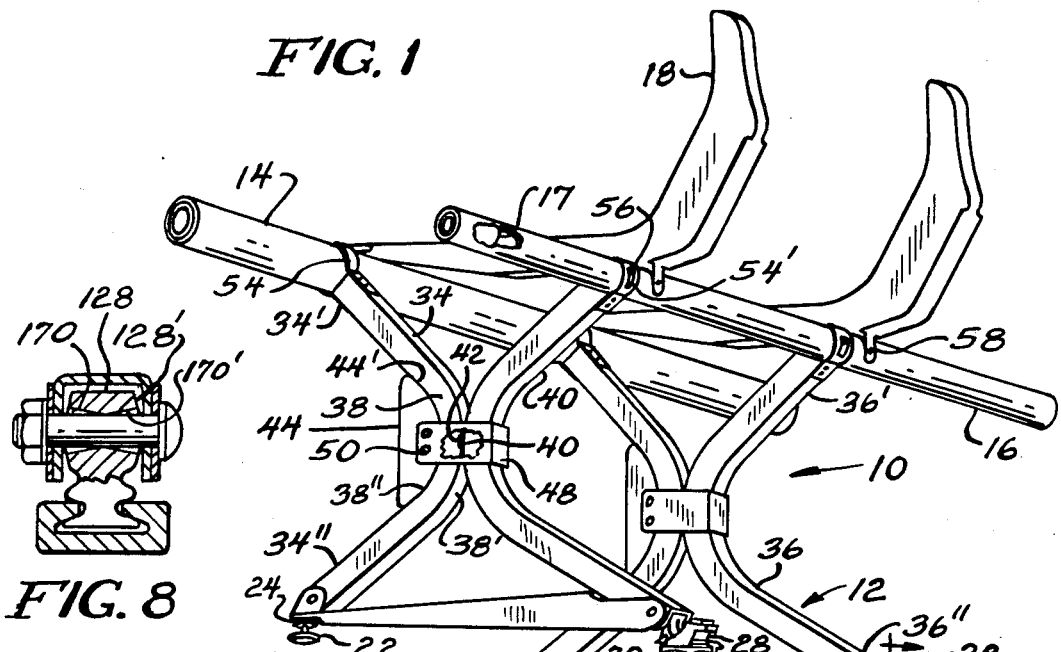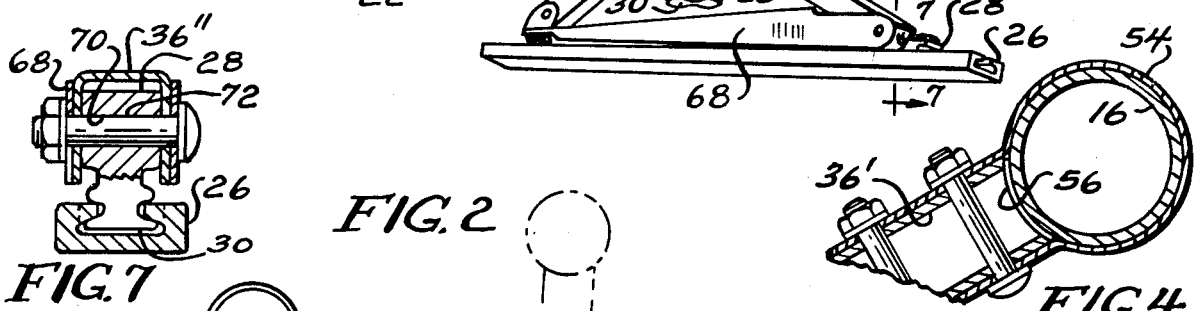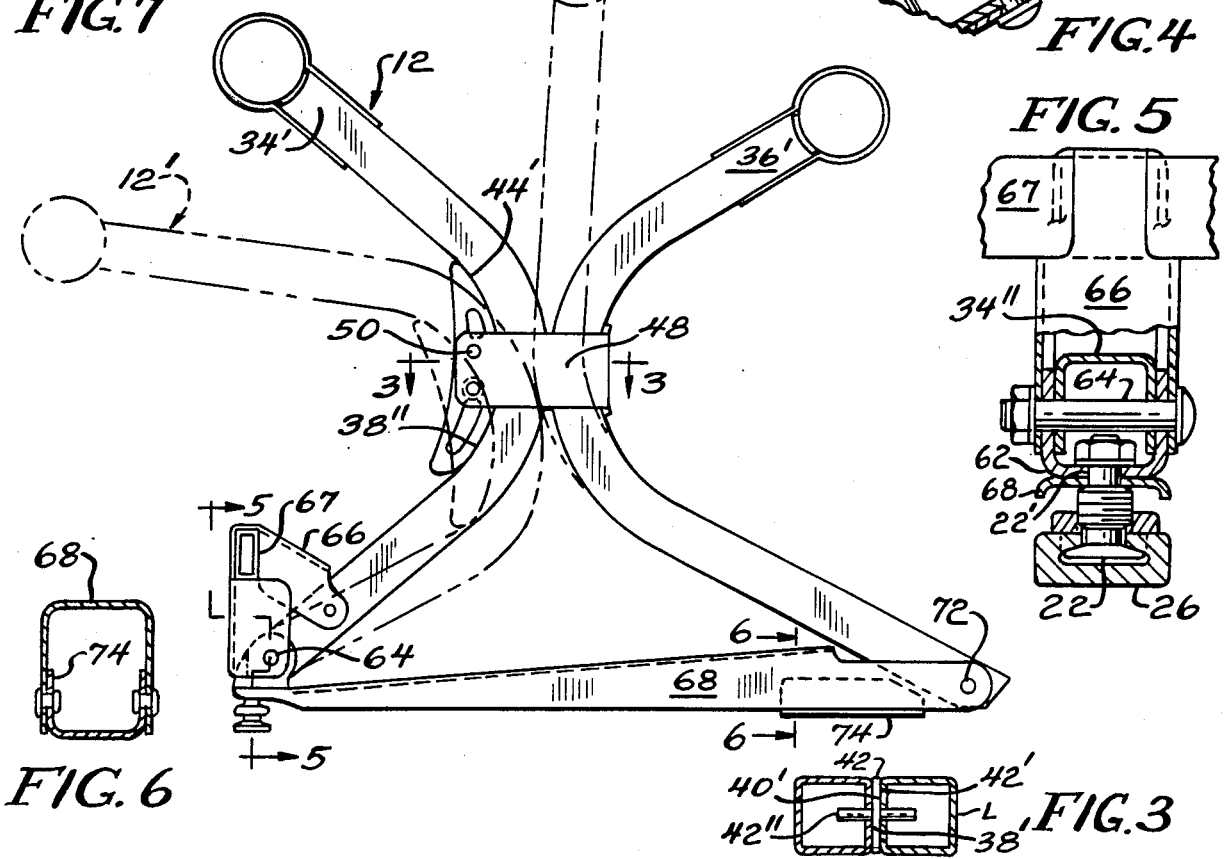

ENERGY ABSORBING AIRCRAFT SEAT FRAME STRUCTURE

BACKGROUND OF THE INVENTION

The invention relates to vehicle seats and particularly to aircraft seats. A critical aspect of survivable aircraft crashes has been the ability of the seats to remain attached to the floor structure. In certain accidents, the seat track in the floor of the aircraft has fractured when overloaded by forces applied to it by a seat. It is well known that a given seat design having a predetermined distance between its front and rear legs can be made to absorb more "G" loadng than the amount currently specified by the United States Federal Aviation Administration (FAA), which is noted supra. However, to do so, the seat tracks and other supports in the aircraft floor would probably have to be replaced with much stronger and heavier members. Furthermore, any modification of the basic airframe structure of existing aircraft would be extremely expensive. Also, the additional weight of stronger supports would cause a significant increase in the operating cost.

It is also known that increasing the spacing between the front and rear support fittings for the front and rear legs of a seat will reduce the bending load exerted on the seat track in a crash situation. This is because the load applied to the rear fitting tends to lift the seat track while the load applied to the front fitting tends to depress the track. Typically, a seat is designed to fail by having its front legs collapse in a controlled mode after the design load is reached. Additional loading generally causes the rear track fittings to tear out of the seat track or causes the seat track to tear out of the floor. As increased operating costs have forced carriers to reduce the pitch distance between seats from about 34 inches (86.4 cm) to as little as 28 or 29 inches (71-74 cm) to accommodate more passengers, it has become quite desirable to minimize the front to rear leg spacing in order to preserve as much passenger foot and leg access room behind the seat as possible. However, as previously noted, the strength of existing seat tracks places a distinct limit on how closely the legs can be spaced for a given seat and seat frame configuration. Under current FAA regulations, using an NAS 809 dummy block (National Aircraft Standard promulgated by the Aircraft Industries Association of America, Inc.), a seat must be able to withstand, in a static test, a force of 6 "G's" with no permanent deformation. The seat can yield, but must not fail, when subjected to loads of 6-9 "G's". The desired failure mode is to have the front legs start to collapse at 9 "G's" so that the rear studs will not pull out of the track, or lift the track from the floor supports, at loads of less than 12 "G's". To permit a particular existing seat, which has a 16 inch (40.6 cm) leg spacing, to resist failure at higher loads, for example, at 16 "G's" rather than 9 "G's", without altering the seat track or aircraft, the leg spacing must typically be increased to about 19 inches (48.3 cm). However, such 19 inch (48.3 cm) spacing is quite undesirable since it greatly reduces passenger access room behind the seat.

It is further known that seats can be manufactured with portions thereof adapted to absorb energy so as to decrease the "G" forces applied to a seat and its occupant in the rapid deceleration conditions of a crash landing. For example, Brewster U.S. Pat. No. 2,959,207 discloses a telescoping rear leg which includes a cylindrical tube which absorbs energy when it is reduced in diameter by being drawn over a die. A somewhat similar arrangement for a front leg is disclosed in Spielman U.S. Pat. No. 3,059,966.

SUMMARY OF THE INVENTION

It is among the objects of the present invention to provide a seat frame structure which, for a particular seat design: permits the various pairs of front and rear legs of the seat: (1) to be postioned closer together than in conventional designs of seats wich are constructed to withstand, in static testing, a given "G" loading force; or, (2) permits the "G" loading ability of the seat to be increased while maintaining a predetermined leg spacing; or, (3) permits a combination of closer leg spacing and improved "G" loading capability.

It is another object of the invention to provide a seat frame structure which can absorb energy by means of a controlled deformation of the legs.

A still further object is to provide a seat with a front leg which is shaped to permit the forward stretcher tube or equivalent support structure to move lower in a crash load situation so as to lower the center of gravity of the seat and its occupants and also to shift excess loading of one front leg structure through the stretcher tube or equivalent support structure to the other front leg structure(s).

Yet another object is to provide a connection means between the seat leg structures of a seat and the stretcher tubes or other support structure to which they are attached which will permit relative pivotal movement between the respective structures.

An additional object of the invention is to provide a connection means between a rear track fitting and the rear seat leg structure of a seat which will permit the fitting of self align so that fore and aft loads applied to the seat will be distributed evenly between the stud portions of the track fitting and the floor track to which the track fitting is adapted to be connected.

A further object of the invention is to provide a connection means between a rear track fitting and the rear seat leg structure of a seat which will permit the fitting to self align so that both for and aft and lateral or twisting loads applied to the seat or seat track will be distributed evenly between the stud portions of the track fitting and the floor track to which the track fitting is adapted to be connected, Another object of the invention is to provide a seat leg structure for a seat which will provide more clearance under the seat for a passenger's feet and luggage than is possible with existing seat leg structures.

These and other objects and advantages are achieved by the improved seat frame structure of the present invention which is designed so that the front and rear support leg members are each of a generally "U" shape with diverging upper and lower leg portions and with the bends of each "U" in contact under the seat so that the overall appearance of the assembly of the front and rear legs, as viewed from the side of the seat, is in the shape of an "X".

A curved die member is mounted in the forward facing concave bend portion of the front leg. A retaining element is provided for retaining the die member relative to the rear leg. Although various structures could be used for this purpose, we prefer to use a U-shaped strap member which passes around the rearwardly facing concave bend portion of the rear leg and has its legs fastened to flat side portions of the curved die member. The U-shaped strap member holds the front and rear legs in tight contact and supports the die member so that the front leg can bend uniformly around it when crash forces are applied to the seat. The bending of the front leg will lower the center of gravity of the seat and its occupants, thus reducing the "G" loading on the seat track even more than it is reduced by the energy absorbed by the deformation of the front leg. A connector member having an enlarged diameter flat intermediate bearing portion has a pair of pin portions projecting normal to the flat portions which are located in small openings in the convex portions of each seat leg which are adjacent to each other. The connector member serves as a bearing surface between the respective convex portions of the seat leg members and prevents relative vertical movement between the respective front and rear seat legs while permitting the upper end of the rear leg to move up as the upper end of the front leg moves down.

The upper ends of the front and rear seat legs are preferably pivotally mounted to the laterally extending fore and aft stretcher tubes by sheet metal clamp rings which surround the stretcher tubes. In the case of a seat such as that disclosed in U.S. Pat. No. 4,526,421 which uses a molded panel for lateral and fore and aft support, the upper ends of the seat legs would be pivotally mounted to brackets attached to the panel. The pivotal mounting allows the legs to deform under crash loads and rotate relative to the stretcher tubes without affecting the integrity of the stretcher tubes which are normally rigidly attached to each other by a fore aft support member. Since the upper ends of the U-shaped front legs are designed to bend around the die members and move downwardly under a crash load, the front leg which sees the most force will start to move down first and will naturally cause the stretcher tube or other support structure which is attached to it to move down with it, thereby transferring some of the excess loading through the stretcher tube or other support structure to the other leg. This feature is especially valuable in the case of a seat, such as a triple seat, wherein there are usually only two legs, and where, due to the location of the seat tracks in the aircraft, it is necessary that at least one seat position be supported in a cantilever fashion and/or where at least one seat position extends much further beyond the legs than another seat position. The advantages of this feature can be even more pronounced in a situation where a triple seat is occupied by only two passengers, but wherein those passengers are seated next to each other on the longest overhanging portion of the seat. The latter loading situation could generate higher loads with respect to certain frame members, such as a leg, than the situation where three passengers occupied all of the positions of the triple seat. In the usual construction of a seat frame, the front legs are straight and rigidly affixed to the stretcher tubes. Thus, they will tend to remain straight when loaded and will not permit any lowering of the center of gravity until they start to collapse. Also, such straight legs will act as fulcrums for the stretcher tubes so that the cantilevered loads which are applied laterally outwardly of the legs at each end of the seat will tend to act independently. By making the front legs so that they can deform, and thereby alow the excess load on one leg to be shifted by means of the stretcher tube or other support structure, it is possible to either eliminate the need for using tube reinforcements in the region of the leg locations or permit thinner tubes to be used to accommodate a given loading.

The lower ends of the set of front and rear legs which make up each leg assembly are attached to each other by a generally channel-shaped track covering connector tension member. The connector tension member is pivotally connected to the rear track fitting member by a horizontal pin which is mounted in a bearing aperture in the fitting member. In a modification, each of the ends of the aperture are tapered so that the fitting can tilt from side to side relative to the pin and seat. This ability to tilt can accommodate twisting rotation of the track in a crash situation. Normally, a rear track fitting has at least two studs having enlarged heads which are adapted to engage the under surface of the seat track. Conventional track covering connector members are normally tension members in the form of a strap or of a channel shape having relatively short flanges. Such conventional connecting members are adapted to be retained to the rear track fitting by a vertical bolt which passes through a hole in the top surface of the strap or channel at one end thereof. The advantage of mounting the rear track fitting to the track covering connector member with a horizontal pivot, as described hereinabove, is to permit the rear fitting to self align with the seat track when the seat track is deformed in a vertical direction so that the loading applied to the fitting by the rear seat leg will be distributed uniformly to the seat track by each of the pair of studs. This self alignment feature is of great value and is enhanced further by the fitting of the modification embodiment disclosed herein which permits side to side tilting, since it has been determined that seat tracks can be distorted both laterally and fore and aft in a crash so that one portion might be lifted or rotated relative to another portion. For example, the specially shaped cargo containers that are designed to be placed in the belly of an aircraft lie directly under the floor which supports the seat tracks. In a crash, these containers get compressed and can move upwardly into engagement with the floor of the passenger compartment where they can distort the seat tracks. By providing pin joints on the seat and track fittings, as described, it is possible to cause the seat to remain in firm engagement with the seat tracks even after the seat tracks have been distorted.

BRIEF DESCRIPTION OF THE DRAWINGS

FIG. 1 is a perspective view showing the seat frame structure of the present invention attached to the fore and aft stretcher tubes and fore and aft support members of a triple seat;

FIG. 2 is a side view illustrating the energy absorbing leg assembly, with the crash position of the legs shown in phantom lines;

FIG. 3 is a section view taken on lines 3—3 of FIG. 2 and illustrating the double-ended pin connector member that acts as a bearing between the front and rear legs:

FIG. 4 is an enlarged view showing the detail of the joint between the upper rear leg member and the rear stretcher tube;

FIG. 5 is a front cross-sectional view of the front leg taken on line 5—5 of FIG. 2;

FIG. 6 is a cross-sectional view of the track covering connector member taken on line 6—6 of FIG. 2;

FIG. 7 is a cross-sectional view of the rear leg and track fitting taken on line 7—7 of FIG. 1;

FIG. 8 is a cross-sectional view similar to FIG. 7 but illustrating a modified track fitting which supports the seat leg even when the floor track and fitting become tilted sideways relative to the leg;

DETAILED DESCRIPTION OF THE DRAWINGS

Figure 9:
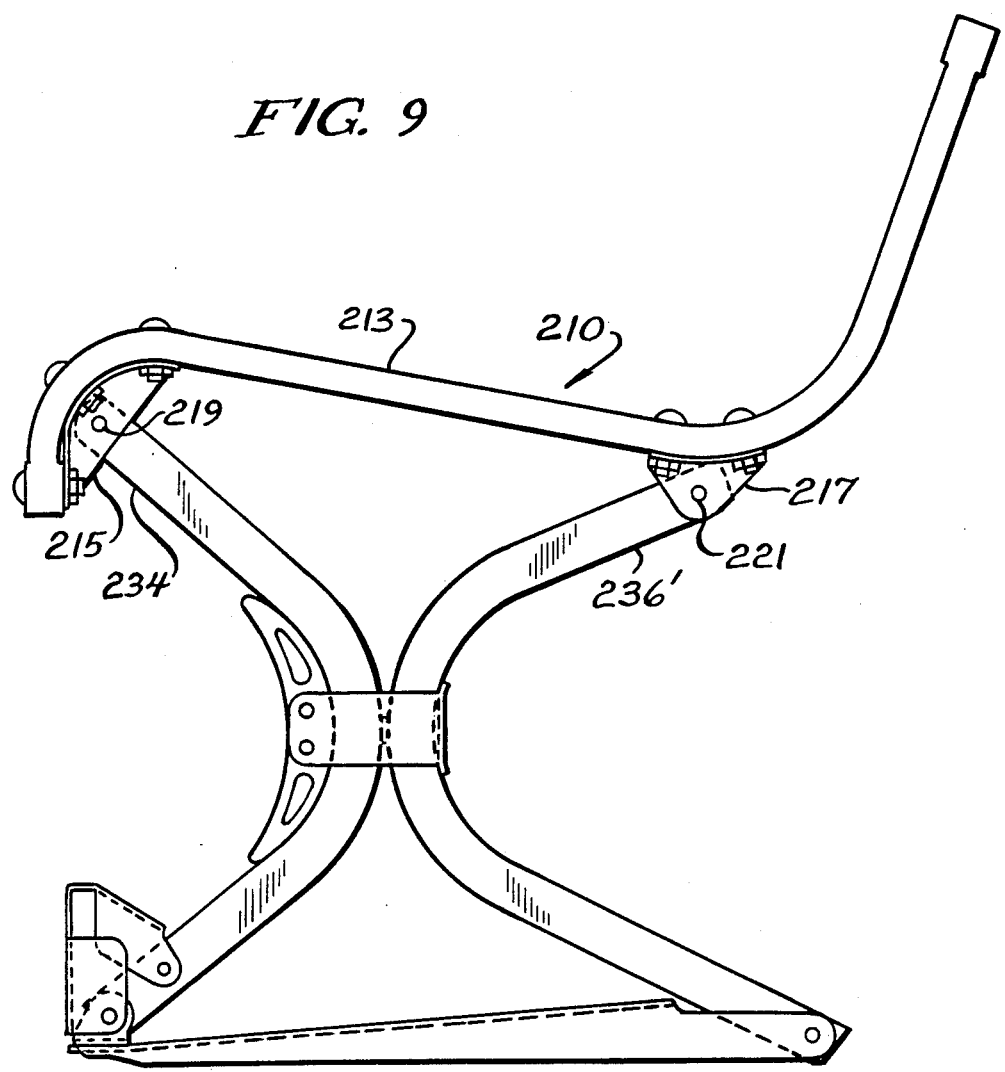
FIG. 9 is a side view illustrating a modification of the assembly shown in FIG. 1 in which the "X"leg structure is used to support a panel type seat.

Referring to FIG. 1, the improved energy absorbing seat frame structure of the present invention is indicated generally at 10 and includes a pair of X-shaped leg assemblies 12 which are shown as being mounted to a pair of conventional forward and rearward tubular stretcher members 14, 16, respectively. Although varying numbers of seat positions could be provided, the drawing illustrates the tubular stretcher members 14, 16 as being sized so as to provide fore and aft support for three seat cushion support panels, not shown, which support three seat cushions, not shown, for three seating positions. The stretcher members are rigidly fixed relative to each other by a pair of conventional fore and aft support frame members 18 which are attached to each stretcher member in a conventional fashion. An additional pair of such frame members, not shown, would be mounted at the ends of the seat to support the outer arms and seat belts. The rear stretcher 16 has a thicker wall and smaller diameter than the front stretcher 14 so as to maximize the foot space and stowage space under the seat. A short insert sleeve 17 in the ends of the rear stretcher provides additional support for the aforementioned pair of end mounted frame members. The members 18 divide the seating unit which is defined by the frame structure 10 into three seating positions and provide support for the seat backs, not shown, and other conventional seat elements such as the recline locks and seat belts. The seat frame 10 is adapted to be anchored to the floor of an aircraft by the enlarged diameter stud portion 22 of a front leg fitting member 24. The enlarged diameter stud portion 22 is adapted to pass through one of the spaced slotted holes, not shown, in a conventional seat track 26, and be retained against upward movement by one of the sets of lips, not shown, which are positioned between adjacent holes. Similarly, the rear track fitting 28, which includes a pair of stud portions 30, is adapted to engage the seat track. The rear track fitting includes a conventional shear pin 32 (FIG. 10), which is adapted to fit into one of the holes in the seat track and be retained thereby against fore and aft movement.

Each of the X-shaped leg assemblies 12 includes a U-shaped front leg member 34 and a U-shaped rear leg member 36 which are preferably formed of rectangular metal tubing, but which could be of other materials or shapes. The upper end portion 34' of the front leg member 34 diverges relative to the lower end portion 34". Similarly, the upper end portion 36' of the rear leg member 36 diverges relative to the lower end portion 36". The U-shaped intermediate portions 38 of the front leg and 40 of the rear leg have convex portions 38', 40' which contact each other and are retained against vertical movement relative to each other, by an intermediate connecting pin member 42 having a flat bearing portion 42' and a pair of pins 42" which engage apertures in the convex portions, as best seen in FIG. 3. A die member 44, having a curved rear surface 44', contacts the concave inner surface 38" of the front leg 34 and is retained in tight engagement with it by the U-shaped metal strap member 48 which is attached to the die member by fasteners 50.

The upper end portions 34' and 36' of the front and rear legs 34, 36 are preferably clamped to the stretcher tube members 14, 16 by sheet metal clamp members 54 which frictionally engage the stretcher tubes. The clamp members 54 should be free to rotate relative to the stretcher tubes so as to not cause the stretcher tubes to twist or rotate relative to the fore and aft supports 18 to which the tubes are rigidly attached, when the legs 34, 36 have their upper end portions 34', 36' lifted or lowered, respectively, in a crash situation. To prevent lateral relative movement, it is preferable to provide the strap portion of each clamp 54 with a short peripheral slot 54' in which a pin 55 located on the stretcher tube may move.

FIG. 2 illustrates the X-shaped leg structure 12 in its normal configuration by means of solid lines. The configuration of the X-shaped leg structure which might be expected following a crash is indicated at 12'. In such a situation, the loading of the seat is assumed to be downward and forward and such loading would cause the upper rear leg portion 36' to be lifted up while the upper portion 34' of the front leg would move down. Since the weight of the seat is a quite small fraction of the weight of a typical occupant, the center of gravity of the combined seat and occupant will move down considerably as the occupant's head and torso tend to be thrown forward and downwardly to a generally horizontal position. The lowering of the center of gravity causes a substantial decrease in the loading applied by the seat to the seat track, thus permitting the seat to absorb much higher "G" forces than prior art seats which do not have as much reduction in their center of gravity in a crash. As previously discussed, the typical prior art seat has a generally straight front leg which would tend to maintain its height above the track until it started to collapse.

As the rear leg portion 36' rises to its FIG. 2 crash position indicated by phantom lines, the rear clamp or strap 54 will rotate counter-clockwise relative to the tube 16. This movement will cause the pin 56 which is mounted in the tube 16 (FIG. 1) to end up in the lower end of slot 54'. The die member 44, being strapped to the legs 36, 38, will also be translated to a new position but will move with the legs and will function as a fulcrum to ensure that the bending of the front leg 34 will be uniform and that it will take place over an extended area of the leg.

As best seen in FIG. 4, the upper end portions 36' of the rear legs are preferably clamped to the stretcher tube 16 by sheet metal clamp members 54 which surround the tube. The front legs are similarly mounted. The ends of the legs are preferably finished off with a curved plate 56 which helps spread the loading and also ensures that the outer ends of the tubular legs do not dig into the stretcher tubes and prevent the relative rotation which must take place during a crash.

FIG. 5 illustrates the pivotal attachment of the lower end 34" of the front leg to the threaded upper portion 22' of the stud 22 on the forward fitting member 24 by means of an intermediate U-shaped bracket 62 and a pivot pin 64. The pin 64 also anchors the bracket 66 which supports the baggage bar 67. The vertical stud portion 22' also forms the forward anchor point for the elongated connector tension member 68 which is joined at its opposite end to the rear lower leg portion 36" and also to the rear fitting member 28 by means of a horizontal pin 72 (FIG. 7). The channel member 68 has a considerable height at its rear end so as to permit it to form the bearings for the horizontal pivot pin 72. A short U-shaped reinforcing channel member 74, best seen in FIG. 6, is attached to the channel member 68 near its rear end to provide additional strength. As compared to the usual connector tension member which is fastened at each end to a vertical fitting stud, the rear end of connector member 68 is attached to the rear leg portion 36" and to a bearing aperture 70 within the fitting 28 with a horizontal pivot pin 72. This type of mounting leaves the rear fitting free to rock in a vertical plane relative to the connector member 68 so as to uniformly distribute the loading applied to it by the seat through each of its two track studs 30 in a crash situation. For example, a crash might cause the section of the seat track under one fitting to be moved up or down relative to the section under the other fitting. If the channel 68 was flat, and held to the rear fitting by a vertical stud, it would reinforce the attachment between the fitting and track and prevent self-alignment.

FIG. 8. illustrates a modified form of rear fitting 128 which would accommodate vertical movement of the seat track 26 while distributing the loading between its two studs exactly in the same manner as the fitting 28 in FIG. 7. However, the bearing aperture 170 within the fitting has tapered end portions 170'. The tapered end portions 170' and the curved outside wall surfaces 128' cooperate to permit the fitting to tilt sideways by some predetermined amount, such as about 10°, for example, ineither direction. This additional tilting capability would allow the fitting to tilt with a seat track that got twisted in a crash while still remaining firmly attached to the seat leg and tension connector member 68.

FIG. 9 illustrates how the X-shaped support system of the invention can be used with a seat that does not include fore and aft stretcher tubes 14, 16 or a fore and aft support member 18. The seat assembly 210 which is shown, includes a fiber reinforced panel member 213 of the type disclosed in U.S. Pat. No. 4,526,421. Athough the referenced patent shows the front seat legs of the seat being rigidly attached to the seat panel, the present invention requires that the legs each be capable of pivoting relative to the forward and rearward portions of the seat frame. To accommodate this pivotal movement, the seat panel 213 has brackets 215, 217 attached to its forward and rearward portion. The upper leg portions 234', 236' are attached to the brackets 215, 217 by pivot pin means 219, 221, respectively.

Figure 10:
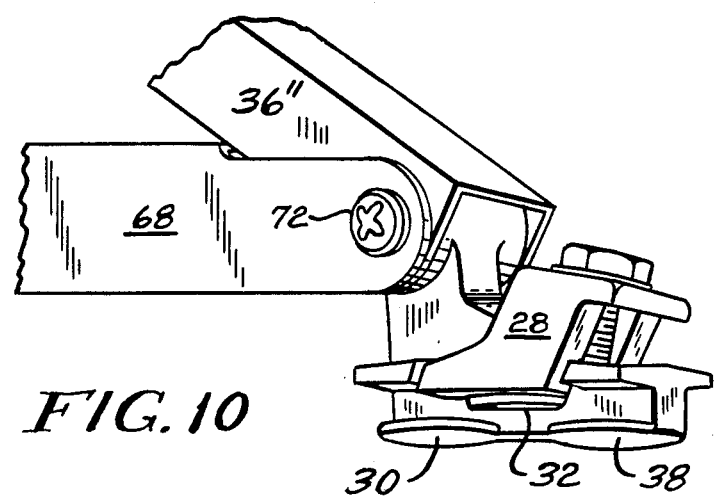
FIG. 10 is a perspective view illustrating the rear leg and rear track fitting.

FIG. 10 is an enlarged perspective view which more clearly illustrates the design of the rear fitting 28 and its connection to the tension connector member 68 and the lower rear leg portion 36" by means of the horizontal bolt 72.

I claim:

1. In a framing system for supporting a plurality of seats in a multi-passenger seating unit which has both lateral and fore and aft support means for supporting seat cushion means, said seating unit including front and rear support leg members attached at their upper ends at spaced locations to fore and aft located portions of said support means so that said upper ends will be maintained at a fixed distance from each other, said front and rear support leg members having their lower ends connected to each other by a connecting member and to a seating track on the floor by at least one track fitting member which includes locking portions which are adapted to engage complementary shaped openings in said seating track; said seating unit being characterized in that said front and rear support leg members are bent into a generally "U" shape with the leg portions of each "U" being divergent from each other and with the outer surface of the bend portion of the "U" of one support leg member being in engagement with the outer surface of the bend portion of the "U" of the other support leg member; said front and rear support leg members each, respectively, having the upper and lower leg portions thereof directed generally forwardly and rearwardly; means for maintaining the front and rear leg support members in engagement with each other at their bend portions; and a curved die member mounted in contact with the curved inside surface of the forward facing bend of the front support leg member, said curved die member serving to guide and control the bending movement of the upper and lower leg portions of said front support leg member toward one another when a sufficient downward and forward force is applied to said seating unit to cause the upper and lower ends of said front support leg member to move toward each other.

2. In a framing system according to claim 1, the improvement wherein said curved die member is maintained in engagement with said front support leg member by a retaining element which is carried by the rear support leg member.

3. In a framing system according to claim 2, the improvement wherein said retaining element comprises a U-shaped strap member.

4. In a framing system according to claim 2, the improvement wherein vertical relative movement between the front and rear support leg portions is prevented by a connector element which has a generally flat bearing surface which is positioned between and is engaged by each of said leg portions, and pin portions extending from the face of said generally flat bearing surface and into apertures in each of said leg portions.

5. In a framing system according to claim 1, the improvement wherein said lateral support means comprise front and rear stretcher tube members and each of said front and rear support leg members have their upper ends attached to said stretcher tube members by a clamp member which comprises a bent length of sheet metal which has a curved intermediate portion which surrounds the major portion of the circumference of the stretcher tube and has its free ends fastened to the front and rear surfaces of the support leg members, said clamp members being maintained in frictional engaging contact with said stretcher tube members but being rotatable relative to said stretcher tube members so that, when sufficient force is applied to said seat to cause said support leg members to deform, said clamp members and support leg members will be able to pivot to a limited degree relative to said stretcher tube members.

6. In a framing system according to claim 5, the improvement wherein at least one of said clamp members includes an elongated peripheral slot which is engaged by a pin mounted in at least one of said stretcher tubes.

7. In a framing system according to claim 1, the improvement wherein said connecting member which is connected to the lower ends of said legs is a generally channel-shaped member which is attached to a rear track fitting and also to the lower end of the rear leg by means of a horizontally disposed pin which passes through a bearing aperture in said rear track fitting and engages vertically extending walls of the connecting member which straddle said rear track fitting.

8. In a framing system according to claim 7, the improvement wherein said bearing aperture is tapered at each of its ends so as to permit a sideways tilting movement of said rear track fitting relative to said horizontally disposed pin.

9. In a framing system according to claim 7, the improvement wherein said bearing aperture is tapered sufficiently to allow said track fitting to tilt about +/−10° relative to said horizontally disposed pin.

10. In a framing system according to claim 1, the improvement wherein said lateral and fore and aft support means comprise a fiber reinforced panel member which has fore and aft positioned bracket elements affixed thereto, said bracket elements being pivotally attached, respectively, to the upper ends of the front and rear support leg members.

11. A framing system according to claim 1 where the upper and lower ends of said support leg members are pivotally attached, respectively, to said support means and to a pair of track fittings.

* * * * *